United States Patent
Hayata et al.

(10) Patent No.: US 9,447,302 B2
(45) Date of Patent: Sep. 20, 2016

(54) PRINTING INK

(75) Inventors: Yuuichi Hayata, Broadstairs (GB);
Brian Woolrich, Broadstairs (GB);
Vincent Wright, Steeple Morden (GB)

(73) Assignee: Sericol Limited (GB)

( * ) Notice: Subject to any disclaimer, the term of this patent is extended or adjusted under 35 U.S.C. 154(b) by 11 days.

(21) Appl. No.: 13/394,107

(22) PCT Filed: Sep. 3, 2010

(86) PCT No.: PCT/GB2010/051455
§ 371 (c)(1),
(2), (4) Date: May 3, 2012

(87) PCT Pub. No.: WO2011/027162
PCT Pub. Date: Mar. 10, 2011

(65) Prior Publication Data
US 2012/0208915 A1    Aug. 16, 2012

(30) Foreign Application Priority Data

Sep. 3, 2009 (GB) .................................. 0915389.1

(51) Int. Cl.
*C09D 11/54* (2014.01)
*C09D 11/10* (2014.01)
*C09D 11/101* (2014.01)

(52) U.S. Cl.
CPC .............. *C09D 11/54* (2013.01); *C09D 11/101* (2013.01)

(58) Field of Classification Search
CPC ............................ C09D 11/101; C09D 11/54
See application file for complete search history.

(56) References Cited

U.S. PATENT DOCUMENTS

| 7,581,829 | B2 | 9/2009 | Oyanagi et al. | |
| 2007/0211110 | A1 | 9/2007 | Iftime et al. | |
| 2008/0038570 | A1 | 2/2008 | Satou et al. | |
| 2008/0108747 | A1* | 5/2008 | Nakamura et al. | 524/606 |
| 2009/0099277 | A1* | 4/2009 | Nagvekar et al. | 522/153 |

FOREIGN PATENT DOCUMENTS

| EP | 1 900 784 A1 | 3/2008 |
| EP | 2 042 572 A1 | 4/2009 |
| EP | 2 088 176 A1 | 8/2009 |
| EP | 2108683 A1 | 10/2009 |
| JP | 2006137183 A | 6/2006 |
| JP | 2009046605 A1 | 3/2009 |
| WO | 2009045703 A1 | 4/2009 |
| WO | 2009/074833 A1 | 6/2009 |

OTHER PUBLICATIONS

Rutsch et al. Recent Developments in Photoinitiators. Progress in Organic Coatings 27 (1996), pp. 227-239.*
International Search Report (ISR) issued in the International Application No. PCT/GB2010/051455.
Search report from priority application No. GB0915389.1, Feb. 2010

* cited by examiner

*Primary Examiner* — Sanza McClendon
(74) *Attorney, Agent, or Firm* — Wood, Phillips, Katz, Clark & Mortimer

(57) ABSTRACT

The present invention provides a colorless inkjet ink composition comprising at least 30% by weight of monofunctional acrylate monomer based on the total weight of the ink and at least 3% by weight of a photoinitiator based on the total weight of the ink, wherein the photoinitiator comprises an α-hydroxy ketone photoinitiator and wherein the ink comprises 0 to 6% by weight of acyl phosphine photoinitiator based on the total weight of the ink.

19 Claims, No Drawings

PRINTING INK

This application is filed under 35 U.S.C. §371 as the U.S. National Stage of International Application PCT/GB2010/051455, filed Sep. 3, 2010, which claims priority of the United Kingdom Patent Application No. 0915389.1, filed on Sep. 3, 2009, the contents of which are hereby incorporated by reference in their entirety.

FIELD OF THE INVENTION

This invention relates to a printing ink, and particularly to a colourless printing ink.

BACKGROUND OF THE INVENTION

In inkjet printing, minute droplets of ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically 200 mPas or less at 25° C. although in most applications the viscosity should be 50 mPas or less, and often 25 mPas or less. Typically, when ejected through the nozzles, the ink has a viscosity of less than 25 mPas, preferably 5-15 mPas and ideally 10.5 mPas at the jetting temperature which is often elevated to about 40° C. (the ink might have a much higher viscosity at ambient temperature). The inks must also be resistant to drying or crusting in the reservoirs or nozzles. For these reasons, inkjet inks for application at or near ambient temperatures are commonly formulated to contain a large proportion of a mobile liquid vehicle or solvent such as water or a low-boiling solvent or mixture of solvents.

Another type of inkjet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such inkjet inks it is necessary to use monomers possessing a low viscosity.

Inkjet inks for printing coloured images include a colouring agent that is typically selected from dyes and pigments.

Printed images having high gloss are preferred for a number of applications such as photographic printing. Although inkjet inks comprising a dye colourant can be used to print high gloss images on high gloss substrates, such inks are susceptible to fading when exposed to the atmosphere and/or light. Images formed from inks comprising pigment are less susceptible to fading but it can be difficult to achieve images with uniform gloss when using these inks. In other words, it can be difficult to achieve the same levels of gloss in inked areas of the image and "white" areas, or areas that are not inked.

Furthermore, the surface of the printed image, particularly images formed from solvent-based inkjet inks, can have little solvent resistance and be susceptible to scratching and abrasion.

Colourless inks have therefore been developed for printing under or over coloured images in order to improve properties of the printed image such as adhesion to the substrate, scratch resistance, abrasion resistance, hardness, gloss and resistance to fading. Colourless inks can also be printed together with coloured inks, particularly inks comprising pigment, in order to provide uniform gloss for photographic applications.

There exists a need for alternative colourless inks that can be printed using an inkjet printer.

BRIEF SUMMARY OF THE INVENTION

Accordingly, the present invention provides a colourless inkjet ink composition comprising at least 30% by weight of monofunctional acrylate monomer based on the total weight of the ink and at least 3% by weight of a photoinitiator based on the total weight of the ink wherein the photoinitiator comprises an α-hydroxy ketone photoinitiator and wherein the ink comprises 0 to 6% by weight of acyl phosphine photoinitiator based on the total weight of the ink.

By "colourless" is meant that the ink of the invention is substantially free of colourant such that no colour can be detected by the naked eye. Minor amounts of colourant that do not produce colour that can be detected by the eye can be tolerated, however. Typically the amount of colourant present will be less than 0.3% by weight based on the total weight of the ink, preferably less than 0.1%, more preferably less than 0.03%. The colourless inks of the invention may also be described as "clear" or "water white".

By acyl phosphine photoinitiator is meant a photoinitiator that includes an acyl phosphine group. Examples include bis(2,6-dimethylbenzoyl)-2,4,4-trimethylpentylphosphineoxide, bis(2,4,6-trimethylbenzoyl)-phenylphosphineoxide, his (2,6-dimethoxybenzoyl)-2,3,3,-trimethyl-penthylphosphineoxide and (2,4,6-trimethylbenzoyl)diphenylphosphine oxide.

DETAILED DESCRIPTION OF THE INVENTION

The inks of the invention are able to produce images having high gloss. Furthermore, the inks of the invention can be jetted reliably because they are not susceptible to polymerisation in the printer nozzle when exposed to stray low-level radiation at the printhead. Printed films produced from the inks of the invention are flexible and show good adhesion to substrates.

It is believed that the inks of the present invention are able to produce printed images having high gloss due to the presence of the α-hydroxy ketone photoinitiator. Although not wishing to be bound by theory, it is thought that α-hydroxy ketone photoinitiator that is present at the surface of the printed image is inhibited to some extent by oxygen from the atmosphere. This means that curing of ink at the surface of the printed image is expected to be slowed, which allows the ink at the surface to spread and flow to some extent before curing, forming a smooth, flat surface with high gloss. Surprisingly, the gloss is also improved by limiting the amount of acyl phosphine photoinitiator that is present in the ink.

Monofunctional acrylate monomers are esters of acrylic acid and are well known in the art. Examples include phenoxyethyl acrylate (PEA), cyclic TMP formal acrylate (CTFA), isobornyl acrylate (IBOA), tetrahydrofurfuryl acrylate (THFA), dicyclopentenyl oxyethyl acrylate, 2-(2-ethoxyethoxy)ethyl acrylate, octadecyl acrylate, tridecyl acrylate, isodecyl acrylate (iso-decyl A) and lauryl acrylate. The ink of the invention can include one monofunctional acrylate monomer or a mixture of two or more monofunctional acrylate monomers.

The ink of the invention preferably comprises 35 to 80% by weight of monofunctional acrylate monomer, based on the total weight of the ink.

The ink of the present invention may optionally include other radiation curable monomers that are suitable for use in radiation curable inkjet inks. Examples include multifunctional (meth)acrylate monomers, N-vinyl amides, N-(meth)acryloyl amines and β-unsaturated ether monomers.

Examples of the multifunctional acrylate monomers which may be included in the inkjet inks include hexanediol diacrylate (HDDA), trimethylolpropane triacrylate, pentaerythritol triacrylate, polyethyleneglycol diacrylate, for example, tetraethyleneglycol diacrylate), dipropyleneglycol diacrylate (DPGDA), tri(propylene glycol) triacrylate, neopentylglycol diacrylate, bis(pentaerythritol) hexaacrylate, 3-methyl pentanediol diacrylate (3-MPDA) and the acrylate esters of ethoxylated or propoxylated glycols and polyols, for example, propoxylated neopentyl glycol diacrylate (NPGPODA), ethoxylated trimethylolpropane triacrylate, and mixtures thereof. Particularly preferred are di- and trifunctional acrylates. Also preferred are those with a molecular weight greater than 200.

In addition, suitable multifunctional (meth)acrylate monomers include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

When present in the ink of the invention, multifunctional (meth)acrylate monomers may be included in an amount of 15 to 50% by weight based on the total weight of the ink, for example 20 to 40%.

(Meth)acrylate is intended herein to have its standard meaning, i.e. acrylate and/or methacrylate. Mono- and multifunctional are also intended to have their standard meanings, i.e. one and two or more groups, respectively, which take part in the polymerisation reaction on curing.

N-Vinyl amides are well-known monomers in the art and a detailed description is therefore not required. N-Vinyl amides have a vinyl group attached to the nitrogen atom of an amide which may be further substituted in an analogous manner to (meth)acrylate monomers. Preferred examples are N-vinyl caprolactam (NVC) and N-vinyl pyrrolidone (NVP). Similarly, N-acryloyl amines are also well-known in the art. N-Acryloyl amines also have a vinyl group attached to an amide but via the carbonyl carbon atom and again may be further substituted in an analogous manner to (meth)acrylate monomers. A preferred example is N-acryloylmorpholine (ACMO).

N-Vinyl amides and/or N-acryloyl amines may be included at 3 to 40% by weight, preferably 5 to 30% by weight, more preferably 8 to 18% by weight based on the total weight of the ink. NVC is particularly preferred.

The inks of the present invention may also contain α,β-unsaturated ether monomers, such as vinyl ethers. These monomers are known in the art and may be used to reduce the viscosity of the ink formulation. Typical vinyl ether monomers which may be used in the inks of the present invention are triethylene glycol divinyl ether, diethylene glycol divinyl ether, 1,4-cyclohexanedimethanol divinyl ether and ethylene glycol monovinyl ether. Mixtures of vinyl ether monomers may be used.

When present in the ink, vinyl ether monomers are preferably provided in an amount of 1 to 20% by weight, more preferably 7 to 15% by weight, based on the total weight of the ink. In one embodiment, the weight ratio of acrylate monomer to vinyl ether monomer is from 4:1 and 15:1.

In one embodiment of the invention, the ink comprises one or more monofunctional monomers that include an aliphatic or aromatic cyclic group. The cyclic group may optionally include one or more heteroatoms such as oxygen or nitrogen. Examples include phenoxyethyl acrylate, cyclic TMP formal acrylate, isobornyl acrylate, tetrahydrofurfuryl acrylate, dicyclopentenyl oxyethyl acrylate, N-vinyl caprolactone, N-vinyl pyrrolidone and N-acryloylmorpholine. Preferred inks according to this embodiment comprise a monofunctional acrylate monomer that includes an aliphatic or aromatic cyclic group, such as phenoxyethyl acrylate, cyclic TMP formal acrylate, isobornyl acrylate, tetrahydrofurfuryl acrylate or dicyclopentenyl oxyethyl acrylate.

In another embodiment, the ink of the present invention comprises at least one monomer that includes a $C_6$ to $C_{14}$ linear alkyl group such as isodecyl acrylate, hexanediol diacrylate, or nonanediol diacrylate.

In one embodiment, the ink of the invention comprises a monofunctional acrylate monomer component that includes 0 to 75% by weight of monofunctional acrylate monomer that includes a $C_6$ to $C_{14}$ linear alkyl group and 25 to 100% by weight of a monofunctional acrylate monomer that includes an aliphatic or aromatic cyclic group, based on the total weight of monofunctional acrylate monomer present in the ink.

It is possible to modify the film properties of the inkjet inks by inclusion of oligomers or inert resins, such as thermoplastic acrylics. Said oligomers have a weight-average molecular weight from 500 to 8,000, preferably from 1,000 to 7,000 and most preferably from 2,000 to 6,000. The oligomers are preferably functional (i.e. reactive oligomers), in that they take part in the curing reaction. A suitable example is a urethane oligomer. The functionality is preferably 2 to 6 and most preferably the oligomers are difunctional.

Oligomers may be included at 1 to 30% by weight, preferably 2 to 20% by weight and more preferably 3 to 15% by weight, based on the total weight of the ink.

In one embodiment, the inkjet ink of the present invention comprises at least one monofunctional acrylate monomer; optionally an N-vinyl amide monomer or N-acryloyl amine monomer; and a functional oligomer as defined above. In another embodiment the inkjet ink of the present invention comprises at least one monofunctional acrylate monomer; optionally an N-vinyl amide monomer; a functional oligomer and a multifunctional (meth)acrylate monomer. In both cases the monofunctional acrylate monomer preferably includes at least one monofunctional acrylate monomer that includes an aliphatic or aromatic cyclic group.

The inkjet inks of the present invention dry primarily by curing, i.e. by the polymerisation of the monomers present, as discussed hereinabove, and hence are curable inks. Such inks do not, therefore, require the presence of water or a volatile organic solvent to effect drying of the ink, although the presence of such components may be tolerated. Therefore, the inkjet inks of the present invention are preferably substantially free of water and volatile organic solvents. However, trace amounts of volatile organic solvents present or trace amounts of water inevitably present by absorption from the air may be tolerated in the ink provided they do not adversely affect the cure speed.

The ink of the invention comprises α-hydroxy ketone photoinitiator. Such photoinitiators are known in the art and include 1-hydroxycyclohexyl phenyl ketone, 2-hydroxy-2- methyl-1-phenyl propane-1-one and 1-[4-(2-hydroxyethoxy)-phenyl]-2-hydroxy-2-methyl-1-propane-1-one. Mixtures of two more α-hydroxy ketone photoinitiators may be used.

The photoinitiator component of the ink of the present invention may also comprise a mixture of at least one α-hydroxy ketone photoinitiator and one or more other free radical photoinitiators. The other free radical photoinitiator(s) can be selected from any of those known in the art for example, benzophenone, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphineoxide, bis(2,4,6-trimethylbenzoyl)-phenylphosphineoxide, bis(2,6-dimethoxybenzoyl)-2,3,3,-trimethyl-penthylphosphineoxide, (2,4,6-trimethylbenzoyl) diphenylphosphine oxide, 2-methyl-1-[4-(methylthio)phenyl]-2-morpholinopropane-1-one and 2-dimethylamino-2-(4-methyl-benzyl)-1-(4-morpholin-4-yl-phenyl)-butan-1-one. The photoinitiators named above are known and commercially available such as, for example, under the trade names Irgacure and Darocur (from Ciba) and Lucerin (from BASF).

The ink of the present invention comprises 0 to 6% by weight of acyl phosphine photoinitiator based on the total weight of the ink, preferably 0 to 4% by weight, more preferably 0 to 3% by weight. For the avoidance of doubt, these ranges are inclusive of 0%. In other words, acyl phosphine photoinitiator may be absent from the inks of the present invention.

Preferably the total amount of photoinitiator in the ink is 3 to 20% by weight, preferably 3 to 15% by weight, based on the total weight of the ink. Preferably the α-hydroxy ketone photoinitiator is present in an amount of 25 to 100% by weight based on the total weight of photoinitiator, more preferably 50 to 100° A) by weight.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of inkjet printing using the above-described ink and a substrate having the cured inks thereon. The ink of the present invention is particularly suited to piezoelectric drop-on-demand inkjet printing. Suitable substrates include styrene, PolyCarb (a polycarbonate), BannerPVC (a PVC) and VIVAK (a polyethylene terephthalate glycol modified).

The ink of the present invention can be printed under or over a coloured image. Preferably the ink of the invention is printed over a coloured image that has been formed by inkjet printing a coloured inkjet ink. The ink of the invention may also be printed at the same time as one or more coloured inkjet inks, preferably inkjet inks comprising a pigment colourant.

The ink of the present invention is cured by exposing the printed ink to actinic radiation. The gloss of the final image can be controlled by varying the exposure procedure. Thus, in one embodiment of the invention the ink is exposed to actinic radiation having an intensity of more than 500 mW/cm$^2$. According to this embodiment, the time delay between jetting the ink onto the substrate and exposure to the actinic radiation is more than 1.0 seconds. In one embodiment, the ink is not exposed to actinic radiation within 1.0 seconds of jetting onto the substrate. Alternatively, the ink may be exposed to actinic radiation having an intensity of less than 300 mW/cm$^2$ within 1.0 seconds of jetting onto the substrate, followed by exposure to actinic radiation having an intensity of more than 500 mW/cm$^2$ more than 1.0 seconds after the ink has been jetted onto the substrate. Curing the ink of the present invention using these methods has been found to improve the surface gloss of the printed film.

The inks of the present invention are preferably cured by ultraviolet irradiation and are suitable for application by inkjet printing. The present invention further provides a set of inkjet inks wherein one of the inks in the set is the ink of the present invention. The present invention also provides a cartridge containing the inkjet ink as defined herein. The cartridges comprise an ink container and an ink delivery port which is suitable for connection with an inkjet printer.

The inkjet ink of the invention exhibits a desirable low viscosity (200 mPas or less, preferably 100 mPas or less, more preferably 25 mPas or less, more preferably 10 mPas or less and most preferably 7 mPas or less at 25° C.). Viscosity may be measured using a Brookfield viscometer fitted with a thermostatically controlled cup and spindle arrangement, such as a DV1 low-viscosity viscometer running at 20 rpm at 25° C. with spindle 00.

The inks of the invention may be prepared by known methods such as, for example, stirring with a high-speed water-cooled stirrer, or milling on a horizontal bead-mill.

The invention will now be described, by way of reference to the following examples.

EXAMPLES

Inkjet ink formulations according to the present invention (Examples 1 to 22) and comparative formulations (Comparative Examples 1 to 3) having the compositions shown in Table 1 were prepared by mixing the components in the given amounts. Amounts are given as weight percentages.

FA512A is dicyclopentenyl oxyethyl acrylate, available from Hitachi Chemical Co., Ltd; CN964 A85 is an aliphatic urethane diacrylate diluted with 15% of TPGDA, available from Sartomer; Irgacure 184 and Irgacure 2959 are α-hydroxy ketone photoinitiators (1-hydroxy-cyclohexyl-phenylketone and 1-[4-(2-hydroxyethoxy)-phenyl]-2-hydroxy-2-methyl-1-propane-1-one, respectively); Darocure TPO is an acyl phosphine photoinitiator; BYK307 is silicone surfactant available from BYK chemie, Firstcure ST-1 is radical inhibitor available from Albemarle Corporation.

The ink formulations were printed onto Avery permanent 400 (a PVC substrate available from Avery) using a LuxelJET UV250GT UV inkjet printer from Fujifilm Graphic Systems Co. Ltd. The resolution was 600*450 dpi and the print size was 2 m(width)*1 m(length). The prints were cured using two Integration Technology SUB ZERO 085 lamp units with H bulbs powered by electronic ballasts with one leading and one trailing, and the power set to level 5/5. The intensity of the radiation was 760 mW/cm$^2$ (total peak area of UVA, UVB and UVC) checked using a UV Power Map system (Electronic Instrumentation & Technology Inc.).

The printed images were tested for cure performance, flexibility and adhesion to the substrate as described below.

Cure Performance

The printed and cured films were touched by hand and the film tackiness was scored as follows:
5: no tack
4: slight tacky
3: tacky
2: slight wet
1: wet Flexibility The printed and cured films were extended at 3 cm/min using an INSTRON 5544 instrument (Instron Limited). The percentage extension at which cracks were generated on the cured film was noted and scored as shown below:
5: More than 50%
4: 40% to 50%
3: 30% to 39%
2: 20% to 29%
1: Less than 20%

Adhesion to the PVC Substrate

The printed films were tested using the ISO2409 cross hatch test (Elcometer Instruments Ltd.) and scored as follows:
5: No cured film removed
4: Less than 10% removed
3: Less than 30% removed
2: Less than 50% removed
1: More than 50% removed In order to test the gloss of the printed inks, the ink formulations were printed over a 100% solid cyan image. The gloss values were obtained using a gloss meter (60 degree measurement) (Sheen Instruments Ltd.) and scored as follows:
5: More than 60
4: 50 to 60
3: 35 to 49
2: 20 to 34
1: Less than 20

In order to test for leaked light stability a 24 μm film of the ink formulation was applied to a sheet of nozzle plate material (Toshiba TEC co.) and the film was exposed to a weak UV lamp (TL-D 18W BLB SLV, Philips) positioned 30 cm from the nozzle plate material for 10 minutes. The sheet was then wiped by paper towel and the area of the sheet on which ink film remained was calculated and scored as follows:
5: 0% (No cured film remained)
4: more than 0% to 5%
3: more than 5% to 10%
2: more than 10% to 30%
1: more than 30%

The results are shown in Table 1.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| NVC | 9 | | | 9 | | 17 | 17 | 25 | 25 | 25 | 9 | 9 | 9 |
| PEA | 40 | 49 | 40 | 20 | 20 | 43 | 46 | 18 | 38 | 47 | 20 | 40 | 14 |
| HDDA | 31 | 31 | 31 | 31 | 31 | 20 | | 20 | | | 20 | | 35 |
| 3MPDA | | | | | | | | | | | | | |
| DPGDA | | | | | | | | | | 8 | | | |
| THFA | | | 9 | | 9 | | | | | | | | |
| IBOA | | | | 20 | | | | 17 | | | 31 | 31 | |
| FA512A | | | | | 20 | | | | | | | | |
| CTFA | | | | | | | | | | | | | |
| NPGPODA | | | | | | | | | | | | | |
| iso-decyl A | | | | | | | | | 17 | 17 | | | 22 |
| CN964 A85 | 11.5 | 11.5 | 11.5 | 11.5 | 11.5 | 11.5 | 11.5 | 11.5 | 11.5 | 11.5 | 11.5 | 11.5 | 11.5 |
| Irgacure 184 | 8 | 8 | 8 | 8 | 8 | 8 | 8 | 8 | 8 | 8 | 8 | 8 | 8 |
| Irgacure 2959 | | | | | | | | | | | | | |
| Darocure TPO | | | | | | | | | | | | | |
| BYK307 | 0.05 | 0.05 | 0.05 | 0.05 | 0.05 | 0.05 | 0.05 | 0.05 | 0.05 | 0.05 | 0.05 | 0.05 | 0.05 |
| Firstcure ST-1 | 0.45 | 0.45 | 0.45 | 0.45 | 0.45 | 0.45 | 0.45 | 0.45 | 0.45 | 0.45 | 0.45 | 0.45 | 0.45 |
| Cure | 5 | 5 | 5 | 5 | 5 | 5 | | 5 | | 5 | 5 | | 3.5 |
| Adhesion on PVC | 5 | 4 | 4 | 5 | 5 | 5 | | 5 | | 5 | 5 | | 5 |
| Gloss | 5 | 5 | 5 | 5 | 5 | 5 | | 5 | | 3.5 | 5 | | 5 |
| Flexibility | 4 | 4 | 4 | 4 | 4 | 5 | | 5 | | 5 | 5 | | 4 |
| Leaked light stability | 5 | 5 | 5 | 5 | 5 | 5 | | 5 | | 5 | 5 | | 5 |

| Example | 14 | 15 | 16 | 17 | 18 | 19 | 20 | 21 | 22 | Comp. 1 | Comp. 2 | Comp. 3 |
|---|---|---|---|---|---|---|---|---|---|---|---|---|
| NVC | 9 | 9 | 9 | 9 | 9 | 9 | 9 | 8 | 9 | 9 | 9 | 9 |
| PEA | 40 | 40 | 40 | 40 | 31 | | | | | 40 | 40 | 40 |
| HDDA | 31 | 31 | 33 | 31 | 29 | | | | | 36.5 | 31.1 | 27.5 |
| 3MPDA | | | | | | 28 | 28 | 24 | 27.5 | | | |
| DPGDA | | | | | | | | | | | | |
| THFA | | | | | | | | | | | | |
| IBOA | | | | | | | | 10 | 26 | | | |
| FA512A | | | | | | | | | | | | |
| CTFA | | | | | | 35 | 25 | | 40 | | | |
| NPGPODA | | | | | 10 | 10 | 10 | 8 | 10 | | | |
| iso-decyl A | | | | | | | | 12 | | | | |
| CN964 A85 | 11.5 | 11.5 | 11.5 | 11.5 | 12.5 | 9.5 | 9.5 | 14.5 | 5 | 11.5 | 11.5 | 11.5 |
| Irgacure 184 | 2.5 | 12.5 | 6 | 4 | 8 | 8 | 8 | 7 | 8 | | | |
| Irgacure 2959 | | | | 4 | | | | | | | | |
| Darocure TPO | 5.5 | | | | | | | | | 2.5 | 7.9 | 11.5 |
| BYK307 | 0.05 | 0.05 | 0.05 | 0.05 | 0.05 | | | | | 0.05 | 0.05 | 0.05 |
| Firstcure ST-1 | 0.45 | 0.45 | 0.45 | 0.45 | 0.45 | 0.5 | 0.5 | 0.5 | 0.5 | 0.45 | 0.45 | 0.45 |
| Cure | 5 | 5 | 5 | 5 | 5 | 5 | 5 | 5 | 5 | 1 | 5 | 5 |
| Adhesion on PVC | 5 | 5 | 5 | 5 | 5 | 4 | 5 | 5 | 5 | — | 5 | 5 |
| Gloss | 4 | 5 | 5 | 5 | 5 | 5 | 5 | 5 | 5 | — | 1 | 1 |
| Flexibility | 4 | 4 | 4 | 4 | 4 | 4 | 4 | 3 | 4 | — | 4 | 4 |
| Leaked light stability | 3 | 5 | 5 | 5 | 5 | 5 | 5 | 5 | 5 | — | 2 | 1 |

The inks of examples 1 and 20 were cured using various curing procedures, as described in examples 23 to 34, below.

A 100% solid colour image (10 cm×30 cm) was produced by printing a cyan ink formulation having the composition shown in Table 2 onto Avery permanent 400 (a PVC substrate available from Avery) using a LuxelJET UV250GT UV inkjet printer from Fujifilm Graphic Systems Co. Ltd.

TABLE 2

| | | wt % |
|---|---|---|
| NVC | monomer | 24.5 |
| PEA | monomer | 39.5 |
| NPGPODA | monomer | 15.5 |
| CN964 A85 | oligomer | 4 |
| Irgacure 184 | initiator | 3 |
| Darocure TPO | initiator | 9.5 |
| Firstcure ST-1 | inhibitor | 0.4 |
| Irgaliteblue GLVO (PB15:3) | pigment | 2.6 |
| Solsperse 32000 | dispersant | 0.97 |
| BYK307 | surfactant | 0.03 |
| | total | 100 |

The colourless ink formulation of example 1 or example 20 was then printed onto the cyan image. The print resolution was 600*450 dpi and the print size was 2 m (width)×1 m (length). The prints were cured using two Integration Technology SUB ZERO 085 lamp units with H bulbs powered by electronic ballasts with one lamp unit leading and one lamp unit trailing. Radiation intensity was measured by addition of the total peak area of UVA, UVB and UVC radiation and checked using a UV Power Map system (Electronic Instrumentation & Technology Inc.).

The ink formulation and exposure conditions for each of examples 23 to 34 are shown below.

Example 23

Ink: example 1.
Leading lamp: power 4, intensity 510 mW/cm$^2$, exposure 1.1 seconds after ink jetted.
Trailing lamp: power 3, intensity 282 mW/cm$^2$, exposure 0.2 seconds after ink jetted.

Example 24

Ink: example 20.
Exposure to radiation as for example 23.

Example 25

Ink: example 1.
Leading lamp: power 5, intensity 760 mW/cm$^2$, exposure 1.1 seconds after ink jetted.
Trailing lamp: power 2, intensity 133 mW/cm$^2$, exposure 0.2 seconds after ink jetted.

Example 26

Ink: example 20.
Exposure to radiation as for example 25.

Example 27

Ink: example 1.
Leading lamp: power 7, intensity 1150 mW/cm$^2$, exposure 1.1 seconds after ink jetted.
Trailing lamp was replaced with an older lamp that provides a lower intensity of radiation for any particular power setting: power 2, intensity 95 mW/cm$^2$ exposure 0.2 seconds after ink jetted.

Example 28

Ink: example 20.
Exposure to radiation as for example 27.

Example 29

Ink: example 1.
Leading lamp: power 7, intensity 1150 mW/cm$^2$, exposure 1.1 seconds after ink jetted.
Trailing lamp: power 0 (no exposure)

Example 30

Ink: example 20.
Exposure to radiation as for example 29.

Example 31

Ink: example 1.
Leading lamp: power 7, intensity 1150 mW/cm$^2$, exposure 5.0 seconds after ink jetted.
Trailing lamp: power 0 (no exposure)

Example 32

Ink: example 20.
Exposure to radiation as for example 31.

Example 33

Ink: example 1.
Leading lamp: power 2, intensity 243 mW/cm$^2$, exposure 2.3 seconds after ink jetted.
Trailing lamp power 0 (no exposure).
After exposure the surface of the print was still wet. Over one minute after jetting the ink, the ink was therefore exposed to further radiation as described below.
Leading lamp: power 7, intensity 1150 mW/cm$^2$. Trailing lamp power 7, intensity 1150 mW/cm$^2$.

Example 34

Ink: example 20.
Exposure to radiation as for example 33.

Comparative Example 4

Ink: example 1.
Leading lamp: power 5, intensity 760 mW/cm$^2$, exposure 1.1 seconds after ink jetted.
Trailing lamp: power 5, intensity 760 mW/cm$^2$ exposure 0.2 seconds after ink jetted.
The printed images were tested for gloss, cure performance, flexibility, adhesion and leaked light stability using the tests described above. In this case the measured 60° gloss value was recorded instead of the 1-5 score. The results are shown in Table 3.

TABLE 3

| Example | | 23 | 24 | 25 | 26 | 27 | 28 | 29 | 30 | 31 | 32 | 33 | 34 | Comp. 4 |
|---|---|---|---|---|---|---|---|---|---|---|---|---|---|---|
| Ink | | Ex. 1 | Ex. 20 | Ex. 1 | Ex. 20 | Ex. 1 | Ex. 20 | Ex. 1 | Ex. 20 | Ex. 1 | Ex. 20 | Ex. 1 | Ex. 20 | Ex. 1 |
| Exposure | Trailing lamp intensity/mW/cm$^2$ (0.2 s after jetting) | 282 | 282 | 133 | 133 | 95 | 95 | None | None | None | None | None | None | 760 |
| | Leading lamp intensity/mW/cm$^2$ (1.1 s after jetting) | 510 | 510 | 760 | 760 | 1150 | 1150 | 1150 | 1150 | | | 133 | 133 | 760 |
| | Leading lamp intensity/mW/cm$^2$ (5.0 s after jetting) | | | | | | | | | 1150 | 1150 | | | |
| | Post exposure intensity/mW/cm$^2$ (more than 1 minute after jetting) | | | | | | | | | | | 1150 | 1150 | |
| Gloss value | | 65 | 67 | 67 | 70 | 68 | 72 | 81 | 85 | 89 | 88 | 88 | 90 | 61 |
| Cure | | 5 | 5 | 5 | 5 | 5 | 5 | 5 | 5 | 5 | 5 | 5 | 5 | 5 |
| Adhesion on PVC | | 5 | 5 | 5 | 5 | 5 | 5 | 5 | 5 | 5 | 5 | 5 | 5 | 5 |
| Flexibility | | 4 | 4 | 4 | 4 | 4 | 4 | 4 | 4 | 4 | 4 | 4 | 4 | 5 |
| Leaked light stability | | 5 | 5 | 5 | 5 | 5 | 5 | 5 | 5 | 5 | 5 | 5 | 5 | 5 |

What is claimed is:

1. A colourless inkjet ink composition comprising at least 30% by weight of monofunctional acrylate monomer based on the total weight of the ink and at least 3% by weight of a photoinitiator based on the total weight of the ink, wherein the photoinitiator comprises an a-hydroxy ketone photoinitiator and wherein the ink comprises 0 to 6% by weight of acyl phosphine photoinitiator based on the total weight of the ink, wherein the colourless inkjet ink comprises 3 to 40% by weight of N-vinyl amide and/or N-acryloyl amine based on the total weight of the ink, and wherein the a-hydroxy ketone photoinitiator is present in an amount of 25 to 100% by weight based on the total weight of photoinitiator, wherein the monofunctional acrylate monomer is selected from the group consisting of phenoxyethyl acrylate, cyclic TMP formal acrylate, isobornyl acrylate, tetrahydrofurfuryl acrylate, dicyclopentenyl oxyethyl acrylate and mixtures thereof, and wherein the n-acryloyl amine is n-acryloylmorpholine.

2. The colourless inkjet ink of claim 1 comprising one or more other radiation curable monomers selected from multifunctional (meth)acrylate monomers, N-vinyl amides, N-(meth)acryloyl amines and unsaturated ether monomers.

3. The colourless inkjet ink of claim 1 comprising 15 to 50% by weight of multifunctional (meth)acrylate monomer, based on the total weight of the ink.

4. The colourless inkjet ink of claim 1 wherein the monofunctional acrylate monomer comprises cyclic TMP formal acrylate.

5. The colourless inkjet ink of claim 1 comprising one or more monomers that includes a C6 to C14 linear alkyl group.

6. The colourless inkjet ink of claim 1 comprising 3-methylpentanediol diacrylate.

7. The colourless inkjet ink of claim 1 wherein the monofunctional acrylate monomer includes 0 to 75% by weight of monofunctional acrylate monomer that includes a C6 to C14 linear alkyl group and 25 to 100% by weight of a monofunctional acrylate monomer that includes an aliphatic or aromatic cyclic group, based on the total weight of monofunctional acrylate monomer present in the ink.

8. The colourless inkjet ink of claim 1 further comprising an oligomer or inert resin.

9. The colourless inkjet ink of claim 1 comprising at least one monofunctional acrylate monomer; a functional oligomer; and, optionally, an N-vinyl amide monomer or N-acryloyl amine monomer.

10. The colourless inkjet ink of claim 1 comprising at least one monofunctional acrylate monomer; a functional oligomer; a multifunctional (meth)acrylate monomer; and, optionally, an N-vinyl amide monomer.

11. The colourless inkjet ink of claim 1 that is substantially free of water and volatile organic solvents.

12. The colourless inkjet ink of claim 1 comprising one or more additional free radical photo initiators.

13. The colourless inkjet ink of claim 1 comprising 3 to 20% by weight of photoinitiator, based on the total weight of the ink.

14. A method of inkjet printing comprising printing the colourless inkjet ink as claimed in claim 1 on to a substrate and exposing the ink to actinic radiation.

15. An inkjet cartridge comprising the ink as claimed in claim 1.

16. A substrate having the ink as claimed in claim 1.

17. The colorless inkjet ink of claim 1 comprising 20 to 40% by weight of multifunctional (meth)acrylate monomer, based on the total weight of the ink.

18. The colorless inkjet ink of claim 1 comprising 3 to 15% by weight of photoinitiator, based on the total weight of the ink.

19. The colourless inkjet ink of claim 1 wherein the a-hydroxy ketone photoinitiator is present in an amount of 50 to 100% by weight based on the total weight of photoinitiator.

* * * * *